(12) United States Patent
Nakagawa et al.

(10) Patent No.: US 10,861,299 B2
(45) Date of Patent: Dec. 8, 2020

(54) VIBRATION CONTROL APPARATUS

(71) Applicant: Sony Interactive Entertainment Inc., Tokyo (JP)

(72) Inventors: Yusuke Nakagawa, Kanagawa (JP); Ikuo Yamano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/500,651

(22) PCT Filed: Apr. 18, 2017

(86) PCT No.: PCT/JP2017/015563
§ 371 (c)(1),
(2) Date: Oct. 3, 2019

(87) PCT Pub. No.: WO2018/193513
PCT Pub. Date: Oct. 25, 2018

(65) Prior Publication Data
US 2020/0051407 A1  Feb. 13, 2020

(51) Int. Cl.
*H04B 3/36* (2006.01)
*G08B 6/00* (2006.01)

(52) U.S. Cl.
CPC ...................... *G08B 6/00* (2013.01)

(58) Field of Classification Search
None
See application file for complete search history.

(56) References Cited

U.S. PATENT DOCUMENTS

| | | |
|---|---|---|
| 6,766,299 B1 | 7/2004 | Bellomo |
| 6,864,877 B2 | 3/2005 | Braun |
| 7,218,310 B2 | 5/2007 | Goldenberg |
| 8,248,218 B2 | 8/2012 | Yamaya |
| 8,249,276 B2 | 8/2012 | Hamada |
| 8,727,878 B2 | 5/2014 | Longdale |
| 8,787,586 B2 | 7/2014 | Hamada |
| 9,007,445 B2 | 4/2015 | Oikawa |

(Continued)

FOREIGN PATENT DOCUMENTS

| | | |
|---|---|---|
| EP | 0999518 A1 | 5/2000 |
| JP | 0884858 A | 4/1996 |

(Continued)

OTHER PUBLICATIONS

International Search Report for related PCT Application No. PCT/JP2017/044072, 4 pages, dated Jan. 16, 2018.

(Continued)

*Primary Examiner* — Julie B Lieu
(74) *Attorney, Agent, or Firm* — Matthew B. Dernier, Esq.

(57) ABSTRACT

A vibration control apparatus that is connectable to plural types of vibrating device, that identifies the type of the vibrating device actually connected to the vibration control apparatus, of the plural types of vibrating device, that obtains property information relating to the vibration property of the identified type of vibrating device, that accepts a vibration instruction, and that causes the connected vibrating device to vibrate for the content produced by correcting the content of the accepted vibration instruction in accordance with the obtained property information.

8 Claims, 4 Drawing Sheets

(56) References Cited

U.S. PATENT DOCUMENTS

| | | |
|---|---|---|
| 9,070,282 B2 | 6/2015 | Clough |
| 9,098,984 B2 | 8/2015 | Heubel |
| 9,430,700 B2 | 8/2016 | Yagcioglu |
| 9,436,280 B2 | 9/2016 | Tartz |
| 9,542,745 B2 | 1/2017 | Moteki |
| 9,630,098 B2 | 4/2017 | Mikhailov |
| 9,753,537 B2 | 9/2017 | Obana |
| 9,792,501 B1 | 10/2017 | Maheriya |
| 9,846,484 B2 | 12/2017 | Shah |
| 9,940,716 B2 | 4/2018 | Chevassus |
| 9,946,347 B2 | 4/2018 | Nakagawa |
| 9,952,670 B2 | 4/2018 | Watanabe |
| 9,983,671 B2 | 5/2018 | Adachi |
| 10,150,029 B2 | 12/2018 | Yamano |
| 10,175,761 B2 | 1/2019 | Cruz-Hernandez |
| 10,347,093 B2 | 7/2019 | Rihn |
| 10,394,326 B2 | 8/2019 | Ono |
| 10,444,837 B2 | 10/2019 | Takeda |
| 2002/0030663 A1 | 3/2002 | Goldenberg |
| 2002/0080112 A1 | 6/2002 | Braun |
| 2004/0220812 A1 | 11/2004 | Bellomo |
| 2005/0134562 A1 | 6/2005 | Grant |
| 2007/0248235 A1 | 10/2007 | Hamada |
| 2008/0262658 A1* | 10/2008 | Ding ............ G11B 19/042 700/280 |
| 2009/0017911 A1 | 1/2009 | Miyazaki |
| 2010/0016077 A1 | 1/2010 | Longdale |
| 2010/0085462 A1* | 4/2010 | Sako ............ G06T 11/001 348/333.01 |
| 2010/0090815 A1 | 4/2010 | Yamaya |
| 2010/0091096 A1 | 4/2010 | Oikawa |
| 2010/0245237 A1 | 9/2010 | Nakamura |
| 2011/0163946 A1 | 7/2011 | Tartz |
| 2012/0232780 A1 | 9/2012 | Delson |
| 2012/0281849 A1 | 11/2012 | Hamada |
| 2013/0057509 A1 | 3/2013 | Cruz-Hernandez |
| 2013/0250502 A1 | 9/2013 | Tossavainen |
| 2013/0261811 A1 | 10/2013 | Yagi |
| 2014/0176415 A1 | 6/2014 | Buuck |
| 2014/0212000 A1 | 7/2014 | Yagcioglu |
| 2014/0220520 A1 | 8/2014 | Salamini |
| 2014/0266644 A1 | 9/2014 | Heubel |
| 2014/0361956 A1 | 12/2014 | Mikhailov |
| 2015/0042484 A1 | 2/2015 | Bansal |
| 2015/0070261 A1 | 3/2015 | Saboune |
| 2015/0243016 A1 | 8/2015 | Moteki |
| 2015/0273322 A1 | 10/2015 | Nakagawa |
| 2015/0302854 A1 | 10/2015 | Clough |
| 2015/0323996 A1 | 11/2015 | Obana |
| 2015/0339819 A1 | 11/2015 | Chevassus |
| 2016/0012687 A1 | 1/2016 | Obana |
| 2016/0054797 A1 | 2/2016 | Tokubo |
| 2016/0124707 A1 | 5/2016 | Ermilov |
| 2016/0132117 A1* | 5/2016 | Adachi ............ G06F 1/1643 345/173 |
| 2016/0162025 A1 | 6/2016 | Shah |
| 2016/0214007 A1 | 7/2016 | Yamashita |
| 2016/0310844 A1 | 10/2016 | Yamashita |
| 2016/0342213 A1 | 11/2016 | Endo |
| 2017/0038841 A1 | 2/2017 | Takeda |
| 2017/0045991 A1 | 2/2017 | Watanabe |
| 2017/0053502 A1 | 2/2017 | Shah |
| 2017/0061784 A1 | 3/2017 | Clough |
| 2017/0092084 A1 | 3/2017 | Rihn |
| 2017/0097681 A1 | 4/2017 | Ono |
| 2017/0205883 A1 | 7/2017 | Tanaka |
| 2017/0235364 A1 | 8/2017 | Nakamura |
| 2017/0242486 A1 | 8/2017 | Grant |
| 2018/0067313 A1* | 3/2018 | Sako ............ H04N 21/4316 |
| 2018/0098583 A1 | 4/2018 | Keller |
| 2018/0203509 A1 | 7/2018 | Yamano |
| 2019/0105563 A1 | 4/2019 | Yamano |
| 2019/0332174 A1 | 10/2019 | Nakagawa |
| 2020/0225755 A1* | 7/2020 | Lee ............ G06F 3/016 |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |
| JP | 2010092436 A | 4/2010 |
| JP | 2011183374 A | 9/2011 |
| JP | 2012103852 A | 5/2012 |
| JP | 2012226482 A | 11/2012 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015513143 A | 4/2015 |
| JP | 2015118605 A | 6/2015 |
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| WO | 02073385 A1 | 9/2002 |
| WO | 2008078523 A1 | 7/2008 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Preliminary Report on Patentability and Written Opinion for related PCT Application No. PCT/JP2017/044072, 15 pages, dated Jun. 27, 2019.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for corresponding PCT Application No. PCTJP2017044074, 12 pages, dated Jun. 18, 2019.
International Search Report for corresponding PCT Application No. PCT/JP2017/044074, 4 pages, dated Jan. 16, 2018.
International Search Report for corresponding PCT Application No. PCT/JP2017/015563, 2 pages, dated Jun. 13, 2017.
International Search Report for corresponding PCT Application No. PCT/JP2017/033925, 4 pages, dated Nov. 7, 2017.
International Search Report for corresponding PCT Application No. PCT/JP2017/015740, 4 pages, dated Jul. 4, 2017.
International Search Report for corresponding PCT Application No. PCT/JP2017/016552, 2 pages, dated Jun. 20, 2017.

(56) References Cited

OTHER PUBLICATIONS

International Preliminary Report on Patentability and Written Opinion for corresponding PCT Application No. PCTJP2017044075, 15 pages, dated Jun. 27, 2019.
International Preliminary Report on Patentability and Written Opinion for related application PCT/JP2017/016552, 13 pages, dated Nov. 7, 2019.
International Search Report for related application PCT/JP2018/026551, 4 pages, dated Aug. 7, 2018.
International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
International Search Report for related PCT Application No. PCT/JP2017/030344, 4 pages, dated Oct. 10, 2017.
International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Office Action for related U.S. Appl. No. 16/345,071, 10 pages, dated Feb. 19, 2020.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
Notice of Reasons for Refusal for corresponding JP Application No. 2019513214, 12 pages, dated Apr. 28, 2020.

\* cited by examiner

VIBRATION CONTROL APPARATUS

TECHNICAL FIELD

The present invention relates to a vibration control apparatus controlling a vibrating device that presents a vibration to a user, a control method therefor, and a control program therefor.

BACKGROUND ART

Among the devices that are each used by wearing the body of the user him/herself or being held by the user, a device including a vibrating mechanism to cause a part of or the whole of the device to vibrate is present such as an operational device that is used for a home-use game machine being connected thereto. A vibrating device including the vibrating mechanism can present a vibration to the user by causing the vibrating mechanism to operate at an optional timing.

SUMMARY

Technical Problem

Plural types of vibrating device of the technique in the above conventional example are present and their vibration properties differ from each other in accordance with the difference in the shape, the performance of the vibrating mechanism, and the like. Dispersion is therefore generated in the vibration felt by the user depending on the type of the vibrating device even when the same control signal is input thereinto.

The present invention was conceived in view of the above circumstances and one of the objects thereof is to provide a vibration control apparatus capable of suppressing any dispersion in the vibration property depending on the type of the vibrating device, a control method therefor, and a control program therefor.

Solution to Problem

The vibration control apparatus according to the present invention is a vibration control apparatus connectable to plural types of vibrating device, and is characterized in that the vibration control apparatus includes an identifying part that identifies a type of a vibrating device actually connected to the vibration control apparatus, of the plural types of vibrating device, a property information obtaining part that obtains property information relating to a vibration property of the identified type of vibrating device, a vibration instruction accepting part that accepts a vibration instruction, and a vibration control part that causes the connected vibrating device to vibrate for a content produced by correcting a content of the accepted vibration instruction in accordance with the obtained property information.

A control method for a vibration control apparatus according to the present invention is a control method for a vibration control apparatus connectable to plural types of vibrating device, and is characterized in that the control method includes a step of identifying a type of a vibrating device actually connected to the vibration control apparatus, of the plural types of vibrating device, a step of obtaining property information relating to the vibration property of the identified type of vibrating device, a step of accepting a vibration instruction, and a step of causing the connected vibrating device to vibrate for a content produced by correcting a content of the accepted vibration instruction in accordance with the obtained property information.

A program according to the present invention is a program to cause a vibration control apparatus connectable to plural types of vibrating device, to function as an identifying part that identifies a type of a vibrating device actually connected to the vibration control apparatus, of the plural types of vibrating device, a property information obtaining part that obtains property information relating to a vibration property of the identified type of vibrating device, a vibration instruction accepting part that accepts a vibration instruction, and a vibration control part that causes the connected vibrating device to vibrate for a content produced by correcting a content of the accepted vibration instruction in accordance with the obtained property information. This program may be provided being stored in a computer-readable and non-transitory information storage medium.

DESCRIPTION OF EMBODIMENT

Figure 1:
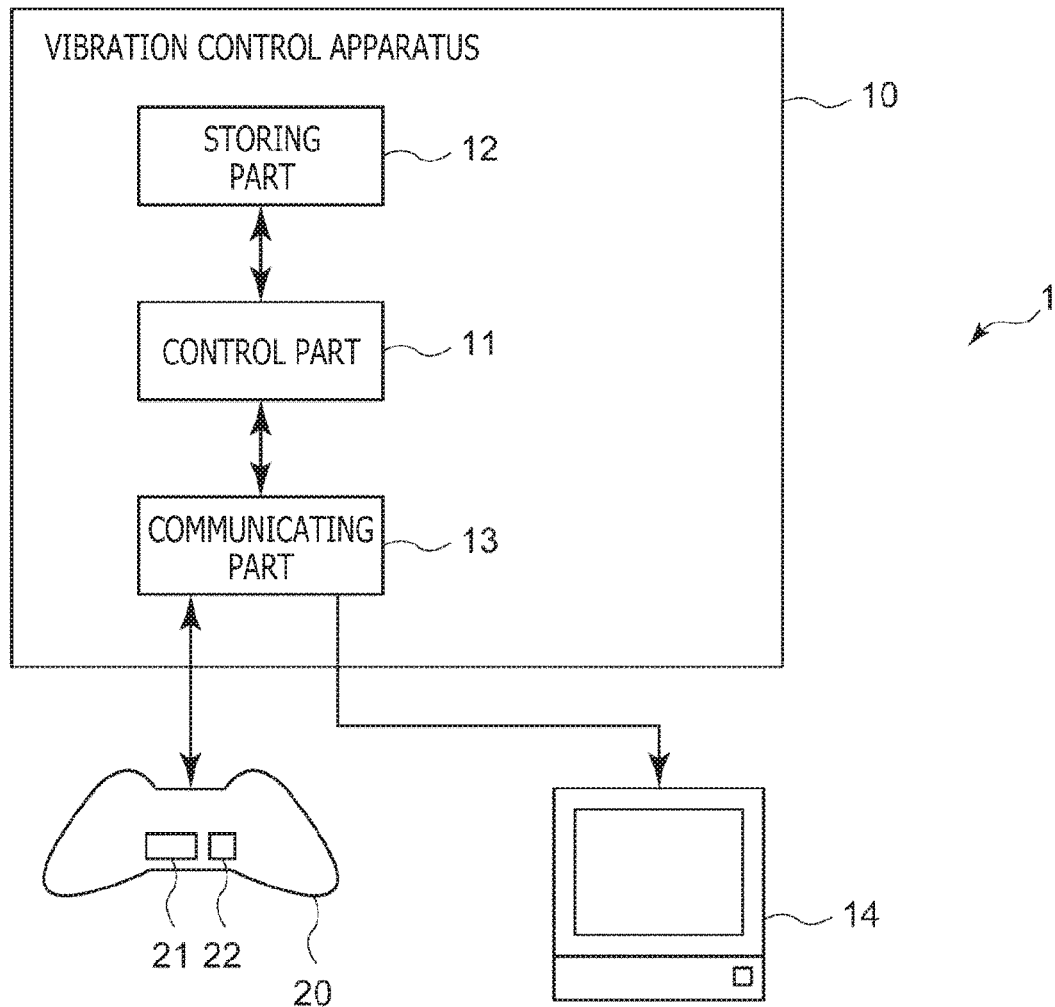
FIG. 1 is a block diagram depicting an example of the configuration of a vibration control system that includes a vibration control apparatus according to an embodiment of the present invention.

An embodiment of the present invention will be described with reference to the drawings. In addition, in the description below, the dimensions, their ratios, the arrangement of the components, and the like are an example and the example of the present embodiment is not limited by the dimensions, their ratios, the arrangement that are depicted and the like.

A vibration control system 1 according to an example of an embodiment of the present invention is configured including a vibration control apparatus 10 and a vibrating device 20 connected to the vibration control apparatus 10.

The vibrating device 20 is a device used by a user holding the hand or wearing the body of the user. The vibrating device 20 incorporates therein a vibrating mechanism 21, and presents a vibration to the user by causing the vibrating mechanism 21 to operate. The vibrating mechanism 21 may be any one of various types of vibration producing element such as a linear resonance actuator, a voice coil motor, an eccentric motor, and the like. Moreover, the vibrating device 20 may include various types of operational member such as operational buttons, levers, and the like to be operated by the user.

In the present embodiment, plural types of vibrating device 20 can be connected to the vibration control apparatus 10. The vibrating device 20 likely to be connected to the vibration control apparatus 10 will hereinafter be referred to as "candidate vibrating device." These plural types of candidate vibrating device are different from each other in any one of the manufacturer, the overall device shape, the type of the incorporated vibrating mechanism 21, and the like, and the properties of the produced vibrations are therefore different from each other.

Furthermore, in the present embodiment, the vibrating device 20 includes an incorporated memory 22. The incorporated memory 22 stores therein device model identification information that identifies the type (the device model) of the vibrating device 20. Specifically, the device model identification information may include, for example, information that identifies the manufacturer that manufactures the vibrating device 20 and information relating to the model number and the like.

The vibration control apparatus 10 is an information processing apparatus connected to the vibrating device 20 for communication therewith, and may be, for example, a home-use game machine or a personal computer. Moreover, in the present embodiment, the vibration control apparatus 10 is also connected to a displaying apparatus 14 for communication therewith. As depicted in FIG. 1, the vibration control apparatus 10 is configured including a control part 11, a storing part 12, and a communicating part 13.

The control part 11 includes a program control device such as a central processing unit (CPU), and executes various types of information processing in accordance with programs stored in the storing part 12. The specific content of the processing executed by the control part 11 will be described later in detail.

The storing part 12 is a memory device or the like, and retains the programs to be executed by the control part 11. These programs are provided being stored in a computer-readable and non-transitory storage medium, and may be the programs duplicated into the storing part 12. Moreover, the storing part 12 also operates as a work memory of the control part 11.

The communicating part 13 is configured including a serial interface such as a universal serial bus (USB) or a wireless communication interface such as Bluetooth (registered trademark). The vibration control apparatus 10 is connected to the vibrating device 20 through the communicating part 13 to be able to communicate therewith. Especially, in the present embodiment, the communicating part 13 transmits a control signal to cause the vibrating mechanism 21 to operate, in accordance with an instruction from the control part 11. The communicating part 13 further includes a communication interface to communicate by a wire or wireless with the displaying apparatus 14. The vibration control apparatus 10 transmits data relating to a video image to be displayed by the displaying apparatus 14 thereon, to the displaying apparatus 14 through the communicating part 13.

The displaying apparatus 14 displays thereon the video image on the basis of a video signal transmitted thereto from the vibration control apparatus 10. For example, the displaying apparatus 14 may be a device of a type that is used by wearing the head of the user such as a head-mounted display or the like.

Figure 2:
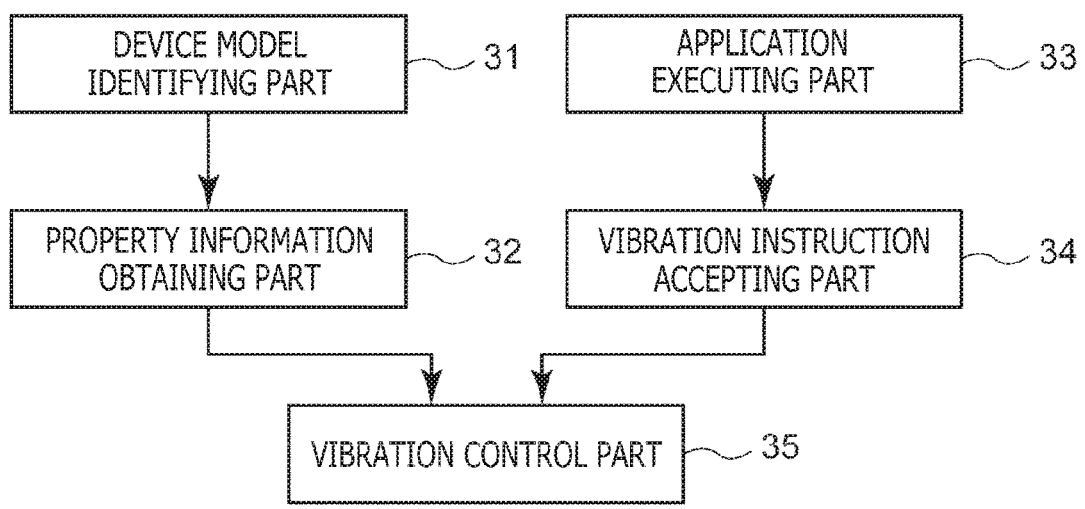
FIG. 2 is a functional block diagram depicting the functions of the vibration control apparatus according to the embodiment of the present invention.

Operations of the control part 11 of the vibration control apparatus 10 will be described below. As exemplified in FIG. 2, the control part 11 in the present embodiment is functionally configured including a device model identifying part 31, a property information obtaining part 32, an application executing part 33, a vibration instruction accepting part 34, and a vibration control part 35. These functions are realized by the fact that the control part 11 operates in accordance with the programs stored in the storing part 12. The programs may be provided to the vibration control apparatus 10 through a communication network such as the Internet, or may be provided being stored in a computer-readable information storage medium such as an optical disk.

At a timing such as the timing at which a vibrating device 20 is newly connected to the vibration control apparatus 10, the device model identifying part 31 identifies the type of the connected vibrating device 20. Specifically, the device model identifying part 31 receives the device model identification information stored in the incorporated memory 22 of the vibrating device 20 from the vibrating device 20. The device model identifying part 31 identifies which type of vibrating device 20 is connected, of plural types of candidate vibrating device, by referring to the device model identification information.

Figure 3:
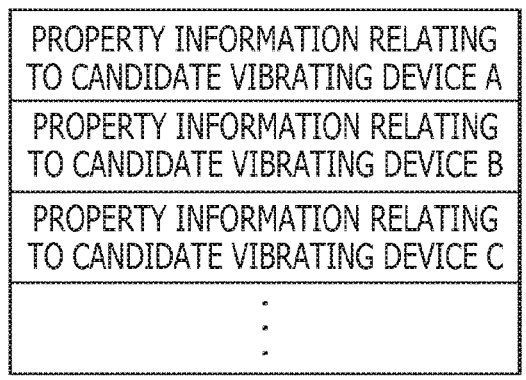
FIG. 3 is a diagram explaining property information stored by the vibration control apparatus.

The property information obtaining part 32 obtains information relating to the vibration property of the vibrating device 20 identified by the device model identifying part 31. As depicted in FIG. 3, it is assumed in the present embodiment that the storing part 12 of the vibration control apparatus 10 stores therein the property information relating to each of the plural types of candidate vibrating device being correlated with the candidate vibrating device. The property information is information relating to the vibration property of the corresponding candidate vibrating device. The specific content of the property information will be described later. When the type of the connected vibrating device 20 is identified by the device model identifying part 31, the property information obtaining part 32 obtains the property information corresponding to the type of the vibrating device 20 by reading the property information.

The application executing part 33 is realized by the fact that the control part 11 executes the application programs such as a game. The application executing part 33 executes various types of processes in accordance with the content of the operation by the user to the vibrating device 20, and causes the displaying apparatus 14 to display on its screen the process results. For example, the application executing part 33 may construct a virtual space that has various types of virtual object arranged therein and may present an image indicating the state of the inside of the virtual space to the user.

Furthermore, the application executing part 33 outputs vibration instruction data to cause the vibrating device 20 to vibrate in accordance with the content of the process thereof. The vibration instruction data includes data that instructs how the vibrating mechanism 21 of the vibrating device 20 is vibrated. For example, the vibration instruction data may include data produced by encrypting the waveform of the vibration to be produced by the vibrating mechanism 21. In this case, the actual operation aspect of the vibrating mechanism 21 is defined by the amplitude and the frequency of the waveform. The vibration instruction data as above may be described in a format similar to sound data. Moreover, similar to the sound data, it is assumed that this vibration instruction data includes a waveform that has vibrations at plural frequencies superimposed on each other. The vibration instruction data output by the application executing part 33 is stored in a buffer area secured in the storing part 12.

The vibration instruction accepting part 34 accepts a vibration instruction that causes the vibrating device 20 to vibrate, from the application executing part 33. Specifically, the vibration instruction accepting part 34 accepts the vibration instruction by sequentially reading the vibration instruction data stored in the buffer area by the application executing part 33.

The vibration control part 35 outputs a control order that causes the vibrating mechanism 21 to operate, to the vibrating device 20, on the basis of the content of the vibration instruction accepted by the vibration instruction accepting part 34. The vibrating device 20 causes the vibrating mechanism 21 to operate on the basis of the control order and thereby causes a vibration of the strength and at the frequency in accordance with the content of the vibration instruction, to be produced. The main body of the vibrating device 20 can thereby be caused to vibrate and the vibration thereof can be presented to the user in accordance with the situation of the game or the like executed by the application executing part 33 according to the present embodiment.

Furthermore, in the present embodiment, the vibration control part 35 corrects the content of the vibration instruction in accordance with the type of the vibrating device 20 identified by the device model identifying part 31, and outputs a control order that causes the vibrating mechanism 21 to operate to have the corrected content, to the vibrating device 20. This correction is for absorption of the difference in the vibration property among the candidate vibration devices.

Especially, in the present embodiment, the correction process is executed such that the vibration property of the connected vibrating device 20 is brought close to the vibration property of a reference vibrating device R. Concerning this, the reference vibrating device R is the vibrating device 20 having a vibration property to be the reference and may be, for example, a vibrating device 20 of the type that is most highly likely to be connected to the vibration control apparatus 10. It is assumed that an engineer developing application programs usually determines the content of the vibration instruction (such as the strength, the frequency, and the like of the vibration) assuming that the reference vibrating device R is connected to the vibration control apparatus 10. A vibration close to the vibration intended by the engineer developing the application program is therefore enabled to be presented to the user by executing the correction process that matches with the vibration property of the reference vibrating device R regardless of the type of the connected vibrating device 20. A specific example of this correction process will be described below.

The content of the property information used in the correction process will be described first. The property information is information relating to the vibration property of the corresponding candidate vibrating device, and indicates what type of correction needs to be executed for the vibration instruction data when this candidate vibrating device is caused to vibrate. Specifically, the property information may be information that instructs, for each frequency, how much the vibration at the frequency is strengthened or weakened.

Figure 4:
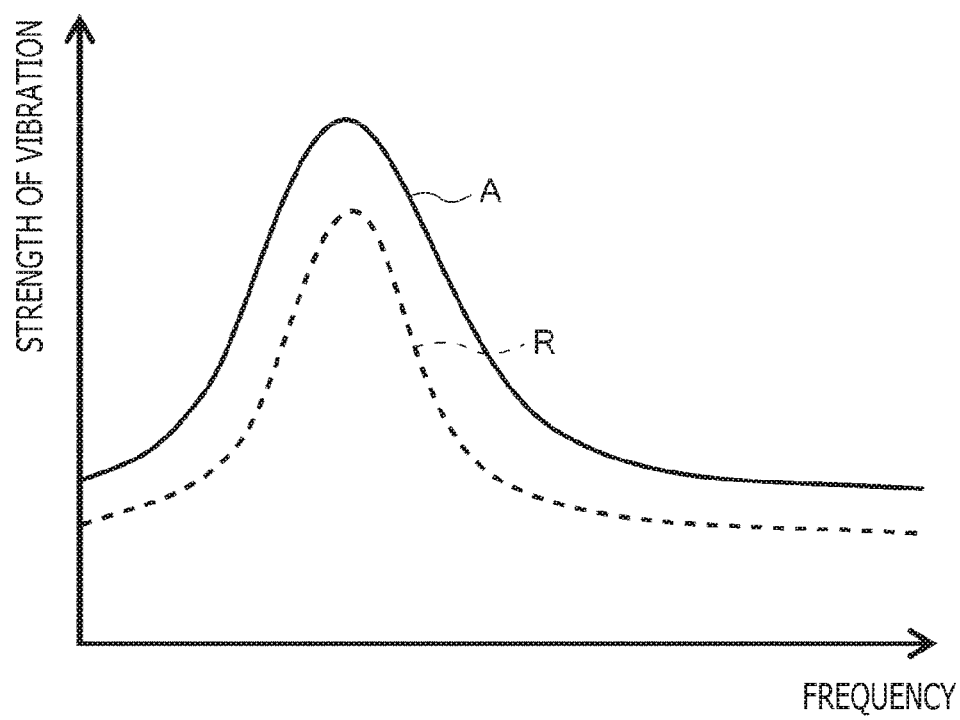
FIG. 4 is a graph depicting an example of the vibration property of a candidate vibrating device.

Especially, in the present embodiment, it is assumed that the property information of each of the candidate vibrating devices is information relating to the difference between the vibration property of the candidate vibrating device and the vibration property of the reference vibrating device R. FIG. 4 is a graph depicting the difference between the vibration property of a certain vibrating device A and the vibration property of the reference vibrating device R. In this graph, the axis of abscissa represents the frequency of the vibration and the axis of ordinate represents the strength of the vibration (the vibration level) that each of the vibrating devices 20 produces for a given reference input voltage. Concerning this, the strength of the vibration is defined, for example, using an acceleration and the like of the vibration that is produced by the vibrating device 20 in the case where a control order to cause the vibration to be produced at a single frequency and at a reference input voltage input into the vibrating mechanism 21. Moreover, a dotted line in FIG. 4 indicates the vibration property of the reference vibrating device R, and a solid line therein indicates the vibration property of the candidate vibrating device A to be noted.

As depicted in FIG. 4, at any frequency, the candidate vibrating device A produces a vibration stronger than that of the reference vibrating device R in the case where the same voltage is input thereinto. The property information corresponding to the candidate vibrating device A is information that indicates the difference in the vibration property between the candidate vibrating device A and the reference vibrating device R. In the case where the candidate vibrating device A is connected to the vibration control apparatus 10, the vibration control part 35 executes correction that wholly weakens the strength of the vibration instructed in the vibration instruction data by referring to the property information. With this correction, the voltage input by the vibrating device 20 into the vibrating mechanism 21 becomes lower than that before the correction and the strength of the vibration produced by the vibrating device 20 becomes close to the strength of the vibration that is assumed to be produced by the reference vibrating device R.

Figure 5:
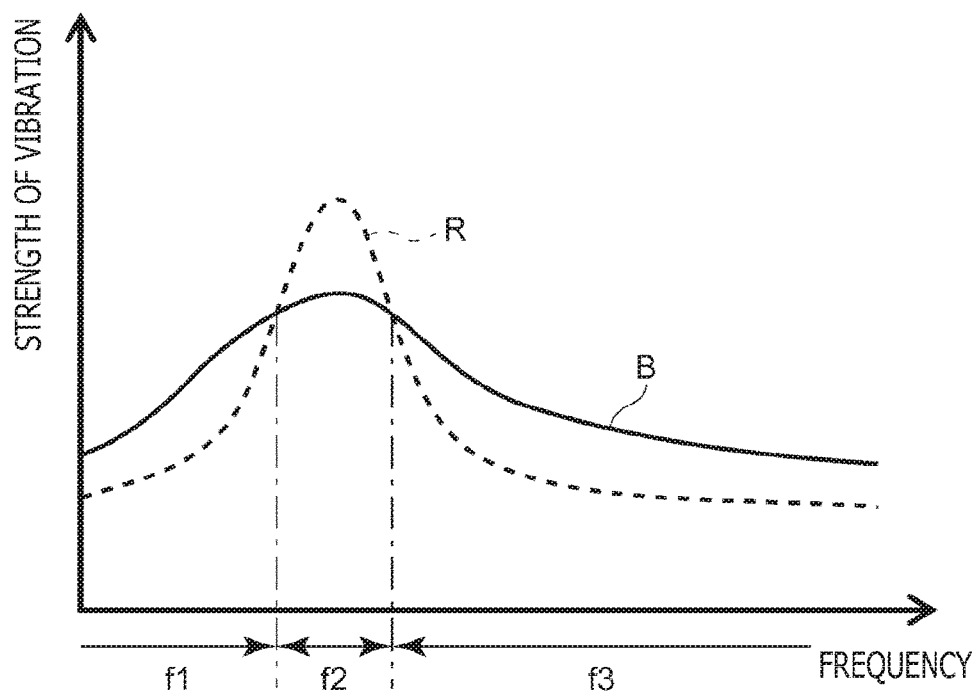
FIG. 5 is a graph depicting another example of the vibration property of the candidate vibrating device.

FIG. 5 is a graph depicting, in a manner similar to that of FIG. 4, the vibration property of a candidate vibrating device B other than that in FIG. 4. Different from the example of the candidate vibrating device A, the candidate vibrating device B may produce a vibration stronger than that of the reference vibrating device R and may produce a vibration weaker than that. More specifically, the candidate vibrating device B produces a vibration that is stronger than that of the reference vibrating device R for the equal input value in frequency bands f1 and f3 and, in contrast, produces a vibration that is weaker than that of the reference vibrating device R in a frequency band f2. The vibration control part 35 therefore varies the content of the correction for each frequency. Specifically, for the frequency components included in the frequency bands f1 and f3, of the vibration waveform included in the vibration instruction data, the correction that weakens the vibration is executed. On the other hand, for the frequency component included in the frequency band f2 thereof, the correction that strengthens the vibration is executed. The strength of the vibration of each frequency component produced by the candidate vibrating device B can thereby be brought close to the strength of the vibration that is assumed to be produced by the reference vibrating device R.

In addition, in the case where the vibration of the candidate vibrating device B is weaker than that of the reference vibrating device R as in the frequency band f2 in the example in FIG. 5, the correction that increases the input voltage is executed to strengthen the vibration while the input voltage cannot unlimitedly be increased and a limit value is present at which the input voltage cannot be increased any more (the upper limit value). In the case where the strength of the vibration obtained when the candidate vibrating device B is caused to vibrate with the upper limit value is weaker than the strength of the vibration obtained when the reference vibrating device R is caused to vibrate with the reference input voltage, the vibration of the reference vibrating device R cannot be reproduced even when the correction process is executed. In this case, the correction process may be executed using either one of two types of method described below.

Figure 6:
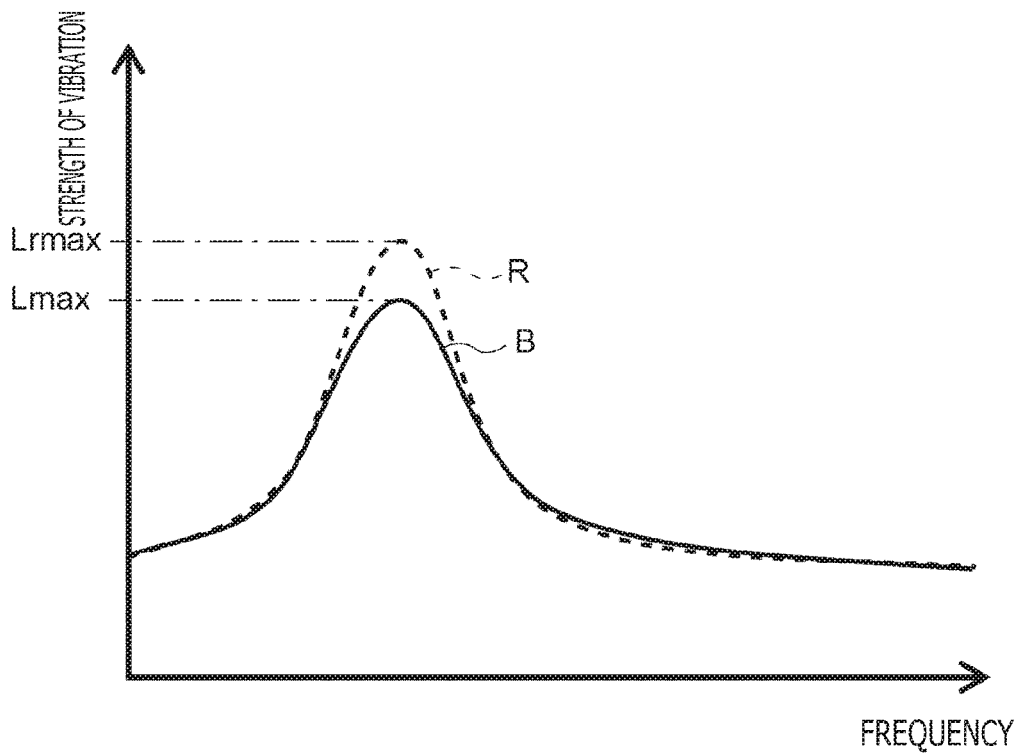
FIG. 6 is a graph depicting an example of the content of a correction process.

The first method is a method according to which the input voltage is increased to the upper limit value for the frequency bands in which the strengths of the vibration are insufficient each even with the upper limit value. In this case, the vibration is weaker than the vibration of the reference vibrating device R while the candidate vibrating device can be caused to vibrate with the maximal strength realizable by the candidate vibrating device. FIG. 6 is a graph explaining the content of the correction process using the first method. In FIG. 6, a dotted line indicates the vibration property of the reference vibrating device R similar to that presented so far, and a solid line indicates the vibration property of the candidate vibrating device B after the correction. Moreover, Lmax denotes the maximal vibration strength that the candidate vibrating device B can produce (that is, the strength of the vibration produced in the case where the upper limit value is input) and Lrmax denotes the maximal vibration strength of the reference vibrating device R obtained when the reference input voltage is input.

Figure 7:
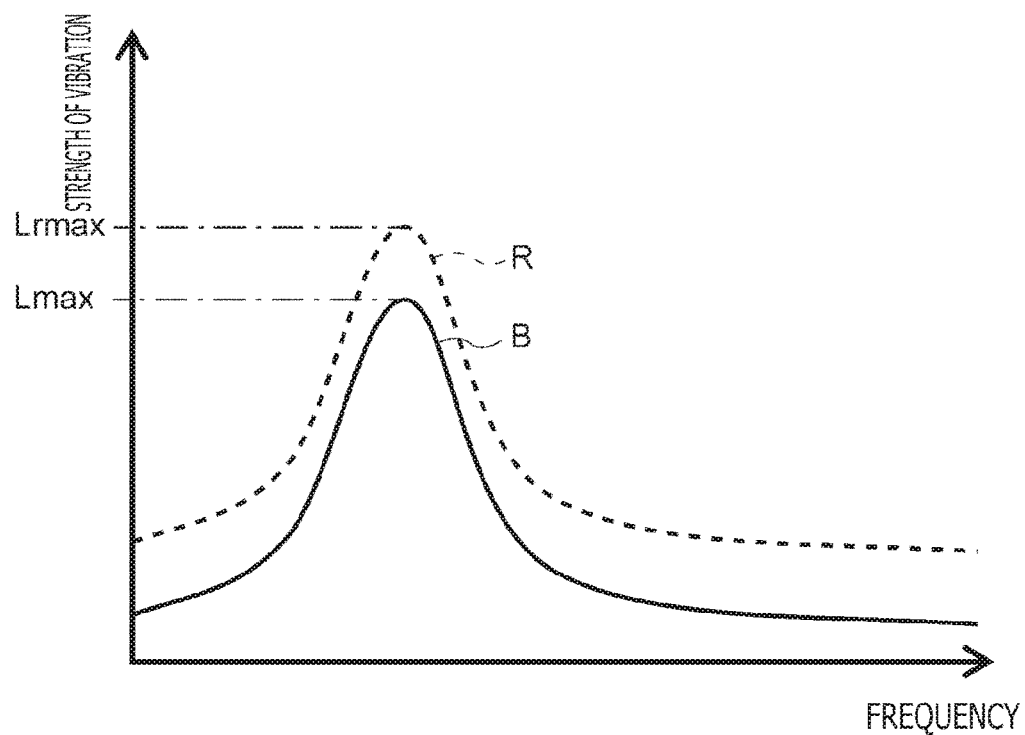
FIG. 7 is a graph depicting another example of the content of the correction process.

The second method is a method of executing the correction such that the frequency-dependent property of the strength of the vibration is maintained. In this method, the correction is executed such that the input value matches with the upper limit value for the frequency at which the vibration of the reference vibrating device R becomes strongest. In addition, for other frequencies, the correction is executed such that the ratio of the strength to the maximal value Lrmax of the strength of the vibration of the reference vibrating device R is maintained. For example, in the case where the strength of the vibration of the reference vibrating device R at a certain frequency is Lr, the strength of the vibration at this frequency is corrected such that the strength L of the vibration after the correction of the candidate vibrating device B is L=(Lr/Lrmax)·Lmax. FIG. 7 is a graph explaining the content of the correction process using the second method. Similar to FIG. 6, the dotted line indicates the vibration property of the reference vibrating device R and the solid line indicates the vibration property of the candidate vibrating device B after the correction. As depicted in FIG. 7, in the correction using the second method, the strength of the vibration wholly becomes weaker than that of the reference vibrating device R while the frequency-dependent property of the strength of the vibration after the correction becomes close to that of the reference vibrating device R. The sense for the vibration felt by the user therefore becomes close to that of the reference vibrating device R.

The property information stored in the storing part 12 may be information that indicates the difference itself in the vibration property between the reference vibrating device R and the candidate vibrating device as described above, or may be information that indicates at what degree the correction needs to be executed for each frequency to absorb this difference. The vibration control part 35 refers to this property information and corrects the vibration waveform included in the vibration instruction data. This correction may be correction that, for each of plural frequency bands, strengthens or weakens the vibration in the frequency band and thereby brings the strength of the vibration close to the strength of the vibration by the reference vibrating device R. A control order obtained by executing this correction is input into vibrating mechanism 21 of the vibrating device 20 and the vibrating device 20 having the vibration property different from that of the reference vibrating device R can thereby be caused to vibrate with the sense close to that of the reference vibrating device R.

Figure 8:
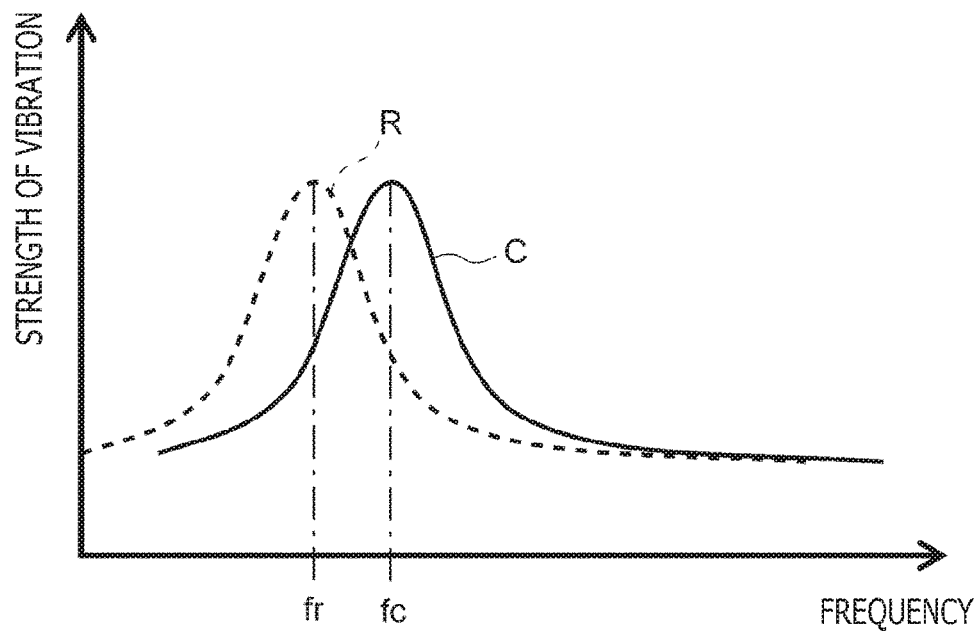
FIG. 8 is a graph depicting yet another example of the vibration property of the candidate vibrating device.

The correction is executed such that the strength of the vibration at each frequency is brought close to that of the reference vibrating device R in the above description while the vibration control part 35 may execute a correction process that varies the frequency of the vibration included in the vibration instruction data instead of the above method. In the examples in FIG. 4, FIG. 5, and the like described so far, the frequency at which the strength of the vibration becomes maximal (the resonance frequency) is matched between the reference vibrating device R and the candidate vibrating device. The resonance frequency of the candidate vibrating device may however be not matched with that of the reference vibrating device R. FIG. 8 is a graph depicting an example of the vibration property of a candidate vibrating device C whose resonance frequency is different from that of the reference vibrating device R. In the example in FIG. 8, the resonance frequency of the reference vibrating device R is fr and the resonance frequency of the candidate vibrating device C is fc. The resonance frequency is the frequency at which the vibrating device 20 can most efficiently produce a strong vibration and it is therefore inefficient to produce a strong vibration at a frequency other than the resonance frequency and, moreover a vibration having the necessary strength may basically be unable to be produced at a frequency other than the resonance frequency.

In such a case, the vibration control part 35 may execute correction that wholly varies the frequency of the vibration included in the vibration instruction data such that the vibration at the frequency fr becomes the vibration at the frequency fc. This correction process that varies the frequency can be realized by, for example, the process similar to pitch shift correction for a sound signal. Specifically, the vibration control part 35 executes a correction process for the overall vibration waveform to multiply the frequency thereof by (fc/fr). The vibration at the frequency fr included in the vibration instruction data is thereby converted into the frequency fc and vibrations each at a frequency other than the frequency fr are each converted at the equal ratio. The connected vibrating device 20 can therefore be caused to vibrate at an efficient frequency without significantly varying the sense of the overall vibration.

The candidate vibrating device may have plural resonance frequencies at each of which the vibration is stronger than the vibrations at the frequencies around the resonance frequency. In this case, the vibration control part 35 only has to execute a correction process that causes any one of the plural resonance frequencies of the candidate vibrating device to match with the resonance frequency fr of the reference vibrating device R. Specifically, for example, the vibration control part 35 executes the correction process such that the resonance frequency closest to the resonance frequency fr of the reference vibrating device R, of the plural resonance frequencies of the candidate vibrating device is caused to match with the resonance frequency fr of the reference vibrating device R. Otherwise, the vibration control part 35 may execute the correction process such that the resonance frequency to be the lowest one, of the plural resonance frequencies of the candidate vibrating device is caused to match with the resonance frequency fr of the reference vibrating device R.

In addition, the vibration control part 35 may execute the process that changes the frequency in combination with the above correction that brings the strength of the vibration for each of the frequencies close to that of the reference vibrating device R. Specifically, for example, the vibration control part 35 may execute the pitch shift correction that converts the frequency fr into the frequency fc and may thereafter correct the strength of the vibration at each frequency such that the frequency-dependent property of the strength of the vibration centering the frequency fc matches with the frequency-dependent property of the reference vibrating device R centering the frequency fr.

Instead of the correction process described above or in addition to the correction process described above, the vibration control part 35 may execute a correction process that shifts the timing of the production of the vibration in accordance with the type of the connected vibrating device 20. In this case, it is assumed that the storing part 12 stores therein information that indicates the correction value for the timing of the production for each of the candidate vibrating devices as at least a portion of the property information. The vibration control part 35 executes the correction process for the timing for the vibration using this correction value. Specifically, the correction process for the timing for the vibration is a process that expedites or delays the timing for the production of the vibration from the timing instructed by the vibration instruction data. According to this correction process, the timing at which the connected vibrating device 20 produces the vibration can be brought close to the timing for the production for the case of the reference vibrating device R. In addition, the vibration control part 35 may correct the timing for the production of the vibration for each of the frequency bands on the basis of the correction value that differs for each frequency band.

The vibration control part 35 may execute a correction process that adds a predetermined vibration waveform to the content of the vibration instruction data or that replaces a part or the whole of the waveform with a predetermined vibration waveform, in accordance with the type of the connected vibrating device 20. For example, the time period up to the time when the produced vibration converges differs depending on the type of the vibrating mechanism 21. The vibration control part 35 may therefore adjust the time period up to the time when the vibration converges by adding a predetermined vibration waveform to the tail of the vibration waveform. Specifically, the vibration control part 35 adds a sine waveform that is out-phase against the last vibration waveform included in the vibration instruction data, that has a predetermined length, and that is at a predetermined frequency, to the tail of the vibration waveform included in the vibration instruction data. The frequency of the added waveform may be the resonance frequency of the vibrating device 20. Moreover, the length of the added waveform may be from approximately a half wavelength to approximately one wavelength. In the case where the convergence time period of the vibrating mechanism 21 incorporated in the vibrating device 20 is longer than that of the reference vibrating device R, the vibration control part 35 can control the convergence time period of the vibrating mechanism 21 by executing the correction process that adds this waveform.

In addition to the correction process based on the property information described above, the vibration control part 35 may further concurrently execute another correction process. For example, the vibration control apparatus 10 may accept a setting of the correction to strengthen or weaken the strength of the overall vibration relative to the standard one. Moreover, the vibration control apparatus 10 may accept a setting of the correction to strengthen or weaken the vibration in a specific frequency band. In the case where this setting is made, the vibration control part 35 further corrects the content of the vibration instruction included in the vibration instruction data in accordance with the setting. The vibration in accordance with the taste of the user can thereby be presented. Moreover, the vibration control part 35 may execute the correction process after correcting the content of the property information, in accordance with the designation from the application executing part 33. The correction process can thereby be executed that strengthens the low frequency band, that reduces the difference in the strength of the vibration in each frequency band, and the like in accordance with the content of the process executed by the application executing part 33.

According to the vibration control system 1 according to the present embodiment described above, the content of the correction process is varied in accordance with the type of vibrating device that is connected, of the plural types of candidate vibrating device, the difference in the vibration property among the vibrating devices is thereby absorbed, and, even when any vibrating device is connected, the vibrating device can similarly be caused to vibrate.

In addition, the embodiment of the present invention is not limited to the one described above. For example, the vibration control apparatus 10 prepares in advance the property information for all the candidate vibrating devices in the above description while the property information obtaining part 32 may obtain the property information from the exterior of the vibration control apparatus 10. For example, the property information obtaining part 32 may request the property information relating to the vibrating device 20 identified by the property information, by transmitting device model identification information that identifies the type of the connected vibrating device 20, to an external server apparatus connected through a communication network such as the Internet or the like. According to this method, even in the case where the vibration control apparatus 10 knows not all the candidate vibrating devices that may be connected thereto, the property information obtaining part 32 can obtain the property information relating to the unknown vibrating device 20 that is newly connected thereto only when the property information is prepared in the server apparatus.

Moreover, in the above description, the property information is the information relating to the difference in the vibration property between the corresponding candidate vibrating device and the reference vibrating device R, and the vibration control part 35 corrects the vibration property of the connected vibrating device 20 to be brought close to that of the reference vibrating device R. The content of the correction process is however not limited to this, and the content of the vibration instruction may be corrected to be brought close to an ideal vibration property determined in advance regardless of any specific vibrating device. In this case, the property information may be information that indicates the vibration property of the corresponding candidate vibrating device using an absolute value.

Moreover, at least a portion of the correction process to be executed by the vibration control part 35 in the above description may be realized by the application program. In this case, the application executing part 33 corrects the waveform of the vibration prepared in advance in accordance with the type of the vibrating device 20 identified by the device model identifying part 31. The application executing part 33 thereafter outputs the vibration instruction data that causes the vibrating device 20 to vibrate according to the corrected content. The vibration control part 35 causes the vibrating device 20 to vibrate on the basis of this vibration instruction data. The vibration corrected in accordance with the vibration property of the connected vibrating device 20 can be produced also by the above process.

Moreover, the application executing part 33 may select the vibration waveform that corresponds to an actually connected vibrating device 20 from the candidate vibration waveforms prepared in advance corresponding respectively to the plural types of candidate vibrating device and may output the vibration instruction data to cause the vibrating device 20 to vibrate according to this vibration waveform. Otherwise, the application executing part 33 may refer to the property information relating to the connected vibrating device 20, may produce in real time the vibration waveform that is matched with the property, and may output this vibration waveform as the vibration instruction data. The connected vibrating device 20 can be caused to vibrate for the content in accordance with the vibration property of the connected vibrating device 20 also by the above process.

Moreover, the vibrating device 20 is the operational device that receives the operational input by the user in the above description while the vibrating device 20 is not limited to this and may be the one dedicatedly used only for presenting the vibration to the user or may be a device used for another use.

Moreover, the correction process is executed by the independent computer other than the vibrating device 20 in the above description while the vibrating device 20 may execute the correction process in accordance with the vibration property of the vibrating device 20. In this case, the vibrating device 20 stores in the incorporated memory thereof in advance the property information relating to the difference between the vibration property of the vibrating device 20 and the vibration property of the reference vibrating device R. In the case where the vibrating device 20 thereafter accepts the vibration instruction data, the vibrating device 20 refers to this property information and executes the correction process for the content of the vibration instruction data. The computer connected to the vibrating device can thereby transmit the vibration instruction data without taking into consideration the vibration property of the connected vibrating device 20.

REFERENCE SIGNS LIST

1 Vibration control system, 10 Vibration control apparatus, 11 Control part, 12 Storing part, 13 Communicating part, 14 Displaying apparatus, 20 Vibrating device, 21 Vibrating mechanism, 22 Incorporated memory, 31 Device model identifying part, 32 Property information obtaining part, 33 Application executing part, 34 Vibration instruction accepting part, 35 Vibration control part.

The invention claimed is:

1. A vibration control apparatus that is connectable to a plurality of types of vibrating device, the vibration control apparatus comprising:
   an identifying part that identifies a type of a vibrating device actually connected to the vibration control apparatus, of the plurality of types of vibrating device;
   a property information obtaining part that obtains property information relating to a vibration property of the identified type of vibrating device;
   a vibration instruction accepting part that accepts a vibration instruction; and
   a vibration control part that causes the connected vibrating device to vibrate for a content produced by correcting a content of the accepted vibration instruction in accordance with the obtained property information.

2. The vibration control apparatus according to claim 1, further comprising:
   a storing part that stores therein property information relating to a vibration property of the vibrating device correlating the property information with each of the plurality of types of vibrating device, wherein
   the property information obtaining part obtains the property information stored in the storing part being correlated with the vibrating device identified by the identifying part.

3. The vibration control apparatus according to claim 1, wherein
   the property information is information relating to a difference in the vibration property between the vibrating device correlated to the property information and a reference vibrating device, and
   the vibration control part executes the correction such that a vibration by the connected vibrating device is brought close to a vibration by the reference vibrating device, in accordance with the property information.

4. The vibration control apparatus according to claim 3, wherein the vibration control part executes, for each of a plurality of frequency bands, the correction such that a strength of a vibration in the frequency band is brought close to a strength of a vibration by the reference vibrating device.

5. The vibration control apparatus according to claim 4, wherein the vibration control part executes the correction such that a frequency-dependent property of the strength of the vibration by the connected vibrating device is brought close to a frequency-dependent property of the strength of the vibration by the reference vibrating device.

6. The vibration control apparatus according to claim 3, wherein the vibration control part executes the correction such that a vibration at a resonance frequency of the reference vibrating device becomes a vibration at a resonance frequency of the connected vibrating device.

7. A control method for a vibration control apparatus that is connectable to a plurality of types of vibrating device, the control method comprising:
   identifying a type of a vibrating device actually connected to the vibration control apparatus, of the plurality of types of vibrating device;
   obtaining property information relating to a vibration property of the identified type of vibrating device;
   accepting a vibration instruction; and
   causing the connected vibrating device to vibrate for a content produced by correcting a content of the accepted vibration instruction in accordance with the obtained property information.

8. A non-transitory, computer readable storage medium containing a computer program, which when executed by a computer, causes the computer to operate as a vibration control apparatus that is connectable to a plurality of types of vibrating device, by carrying out actions, comprising:
   identifying a type of a vibrating device actually connected to the vibration control apparatus, of the plurality of types of vibrating device;
   obtaining property information relating to a vibration property of the identified type of vibrating device;
   accepting a vibration instruction; and
   causing the connected vibrating device to vibrate for a content produced by correcting a content of the accepted vibration instruction in accordance with the obtained property information.

* * * * *